US006623786B2

(12) United States Patent
Baron et al.

(10) Patent No.: US 6,623,786 B2
(45) Date of Patent: Sep. 23, 2003

(54) METHOD FOR HYDROGEL SURFACE TREATMENT

(75) Inventors: Richard Carlton Baron, Alpharetta, GA (US); Qin Liu, Corvallis, OR (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/873,827

(22) Filed: Jun. 4, 2001

(65) Prior Publication Data

US 2001/0024697 A1 Sep. 27, 2001

Related U.S. Application Data

(63) Continuation of application No. 09/157,734, filed on Sep. 21, 1998, now abandoned.
(60) Provisional application No. 60/059,800, filed on Sep. 23, 1997.

(51) Int. Cl.$^7$ .............................. B05D 3/00; B05D 3/06
(52) U.S. Cl. ...................... 427/2.24; 427/2.1; 427/2.3; 427/2.31; 427/536; 427/553; 427/558; 427/307; 427/372.2
(58) Field of Search .................. 428/447; 427/2.24, 427/2.3, 2.1, 2.31, 536, 553, 558, 307, 372.2

(56) References Cited

U.S. PATENT DOCUMENTS

| | | | | |
|---|---|---|---|---|
| 4,595,635 A | | 6/1986 | Dubrow et al. ............. | 428/447 |
| 4,892,402 A | | 1/1990 | Sawamoto et al. .......... | 351/160 |
| 4,954,587 A | | 9/1990 | Mueller ...................... | 526/245 |
| 5,135,297 A | * | 8/1992 | Valint, Jr. ................... | 351/160 |
| 5,296,305 A | * | 3/1994 | Baude et al. ................ | 428/520 |
| 5,789,018 A | * | 8/1998 | Engelson et al. ............ | 427/2.3 |
| 6,001,894 A | * | 12/1999 | Ottersbach et al. ......... | 522/149 |

FOREIGN PATENT DOCUMENTS

| | | | |
|---|---|---|---|
| EP | 0 378 512 A2 | 1/1990 | |
| EP | 0 632 329 A1 | 6/1994 | |
| JP | 62295932 | 12/1987 | |
| JP | 63210143 | 8/1988 | |
| WO | WO 90/00887 | 2/1990 | |
| WO | WO 92/09650 | 6/1992 | |
| WO | WO 95/29203 | 11/1995 | |
| WO | 96/20796 | * 7/1996 | ............ B05D/3/14 |
| WO | WO 96/20919 | 7/1996 | |

OTHER PUBLICATIONS

Standard Search Report.
International Search Report.
A Novel Modification of Polymer Surfaces by Photografting, Tazuke, Shigeo, et al., American Chemical Society, 1980, pp. 217–241.
Photochemical Grafting of Vinyl Monomers onto Starch, Herold, R., et al., Starch/Starke, 33, 1981, Nr. 3, S. pp. 90–97.
With ∂–methylbenzoin Initiated Grafting of Acrylamide and Vinylphosphoric Acid on Synthetic Fibers Under the Influence of UV–light, Herzog, Rolf translation of German article.

* cited by examiner

*Primary Examiner*—Shrive P. Beck
*Assistant Examiner*—Jennifer Kolb Michener
(74) *Attorney, Agent, or Firm*—Jian S. Zhou; Richard I. Gearhart; R. Scott Meece

(57) ABSTRACT

A method of modifying the surface characteristics of a polymeric hydrogel, and a polymer article formed therefrom, without causing substantial swelling or distortion or the hydrogel. A preferred method includes photoinitating of the surface of the article with a benzophenone and grafting a macromer having a number-average molecular weight greater than 1000 in the presence of UV irradiation. The preferred article is a siloxane-containing hydrogel, especially a soft contact lens.

16 Claims, No Drawings

METHOD FOR HYDROGEL SURFACE TREATMENT

This application is a continuation of U.S. application Ser. No. 09/157,734 filed Sep. 21, 1998, now abandoned which claims under 35 U.S.C. §119(e) the benefit of U.S. Provisional Application No. 60/059,800 filed Sep. 23, 1997.

BACKGROUND OF THE INVENTION

1. Field of the Invention

This invention relates broadly to surface modification of polymeric hydrogels. More particularly, the invention relates to the treatment of ophthalmic lenses, especially siloxane-containing hydrogel contact lenses.

2. Description of the Related Art

Ophthalmic lenses, such as contact lenses, are subject to a myriad of requirements. Among other things, contact lenses must be ocularly-compatible, have a high oxygen permeability, allow sufficient tear exchange, have high visual light transmission, be sufficiently thin to fit between the eye and eye-lid, and be comfortable for the wearer. Although the formation of a contact lens from one core material is desirable from a manufacturing viewpoint, many known contact lens materials have one or more disadvantages. For example, polysiloxanes are known to have high oxygen permeability, which is advantageous for a healthy cornea, but most polysiloxanes have insufficient hydrophilicity to allow adequate lens movement on the eye. In order to combine the advantages of two lens materials, research has been directed to the use of a core material which has been surface-coated to modify the core's surface properties while retaining the bulk material properties of the core.

Generally speaking, methods of treating polymer surfaces include (1) corona discharge, (2) surface degradation or oxidation by oxidizing agents such as chromic acid, (3) plasma treatment and/or plasma polymerization, (4) graft polymerization, and (5) coating. For example, "A Novel Modification of Polymer Surfaces by Photografting" (ACS Synp. Ser. v. 121, pages 217–241) discloses a method of photografting monomers to hydrophobic polymers such as polyethylene and polypropylene in a 0.2 M benzophenone initiator solution.

Another example of photografting of monomers onto polymer surfaces is disclosed in "Photochemical Grafting of Vinyl Monomers onto Starch" (Starch 33 (1981) v. 3, pp. 90–97). This reference discusses the grafting of vinyl monomers onto starch under ultraviolet light excitation in the presence of a wide range of photoinitiators, including benzophenone.

U.S. Pat. No. 4,595,635, issued to Dubrow et al. on Jun. 17, 1986, discloses the surface treating of organopolysiloxane materials to increase the surface tack. One method involves applying a photoinitiator to the organopolysiloxane and irradiating the surface with ultraviolet light. Benzophenone is disclosed as a suitable photoinitiator. The treated materials are useful as tapes, sealants and encapsulants.

U.S. Pat. No. 4,892,402, issued to Sawamoto on Jan. 9, 1990, discloses a method for making hard contact lenses more hydrophilic. The method involves contacting a hard lens with a treatment solution containing a hydrophilic monomer, at least one photosensitizer selected from aromatic ketones or quinones, and a solvent, and then irradiating the lens with ultraviolet light. Thus, the disclosed method is a solvent-based polymerization. Benzophenone is an example of a suitable photosensitizer.

While the exist numerous methods of surface treating polymeric articles, there remain problems with the surface treatment of hydrogel materials, especially those suited as ophthalmic lenses. One problem with many surface grafting techniques is that monomer in the treatment solution may penetrate the hydrogel's polymer matrix, and subsequently bind to the polymer below the article's surface. If substantial monomer penetration occurs, the treated polymeric article may swell and distort from the original shape. Even slight distortion can produce substantial optical distortions in an ophthalmic lens. Thus, there remains a need for a method of surface treating hydrogel materials without substantially modifying the shape of the hydrogel.

SUMMARY OF THE INVENTION

An object of the invention is to modify the surface properties of a polymeric hydrogel, without substantially modifying the shape of the hydrogel.

A further object of the invention is to increase the hydrophilicity of the surface of a polymeric hydrogel, without substantially modifying the shape of the hydrogel.

Another object of the invention is to increase the hydrophilicity of the surface of a hydrophilic ophthalmic lens, without substantially impairing the optical properties of the lens.

One embodiment of the present invention is a method of modifying the surface characteristics of a polymeric article, which includes the following steps:

(a) immersing a polymeric article in a first solution including a benzophenone and at least one solvent for a predetermined time period;

(b) removing said article from said first solution;

(c) evaporating at least a portion of said solvent from said article;

(d) placing said article in a second solution containing at least one macromer; and (e) applying radiation to said article for a period sufficient to cause at least a portion of said macromers to bond to the surface of said article, wherein said macromer has a size sufficiently large such that no substantial amount of macromer penetrates said article and causes substantial distortion of said article.

Another embodiment is a polymeric hydrogel article including a core bulk material and a surface coating. The surface coating is formed by graft polymerization with surface photoinitiation in the presence of a benzophenone. The grafted groups are formed from one or more macromers having a size sufficiently large such that no substantial amount of macromer penetrates said lens causing substantial distortion of said lens. The preferred polymeric article is a soft contact lens including a bulk material which is a silicone-containing hydrogel.

DESCRIPTION OF THE PREFERRED EMBODIMENTS

The following terms are defined at the outset in order to facilitate a clear understanding of the present invention. Certain terms are defined subsequently in the text because of the limited use herein.

The term "copolymer", as used herein, means polymers formed from two or more monomers or macromers. Thus, copolymer includes terpolymers and the like.

The term "macromer" as used herein refers to a species having at least one unsaturated bond and having at least two repeating monomer units.

The term "hydrogel", as used herein, refers to a polymeric material which contains at least about 10 weight percent water when fully saturated.

The present invention is a method of modifying the surface characteristics of a polymeric hydrogel. The preferred polymeric articles useful in accordance with the present invention are silicone-containing hydrogel materials. A more preferred subclass of articles which may be treated in accordance with the present invention are ophthalmic lenses, including without limitation thereto, contact lenses, intraocular lenses (i.e., implants), and lenses designed for delivery of pharmaceuticals or other agents to the ocular environment. While contact lenses are the most preferred treatment article, and the invention is discussed primarily with reference to contact lenses, the invention is not so limited.

The advantageous surface treatment method of the present invention generally involves the following steps:

(a) immersing a contact lens in a first solution including a benzophenone and at least one solvent for a predetermined time period;

(b) removing said lens from said first solution;

(c) evaporating at least a portion of said solvent from said lens;

(d) placing said lens in a second solution containing at least one macromer; and (e) applying radiation to said lens for a period sufficient to cause at least a portion of monomers or macromers to bond to the surface of said lens, wherein said macromer has a size sufficiently large such that no substantial amount of macromer penetrates said lens causing substantial distortion of said lens.

The term "Photosensitizer", as used herein include, without limitation thereto, benzophenone, thioxanethen-9-one, 2-acetonaphthone, mixtures thereof and the like.

The term "benzophenone", as used herein, means benzophenone and derivatives thereof which are suited to initiating surface bonding to a contact lens polymer in the presence of applied light, i.e., derivatives suited to photo-initation of surface polymerization. Thus, "benzophenone" includes, without limitation thereto, 2-amino benzophenone; 2-amino-5-chloro benzophenone; 2-amino-4'-methyl benzophenone; 2-amino-5-methyl benzophenone; 2-amino-5-nitro benzophenone; 3-amino benzophenone; 3-amino-4'-methyl benzophenone; 3-amino-4'-methyl benzophenone; 4-amino benzophenone; 4-amino-3-methyl benzophenone; 4-amino-4'-methyl benzophenone. A more preferred group of benzophenones includes benzophenone; 4-fluorobenzophenone; 4-chlorobenzophenone; 4-benzoylbenzoic acid; 3,3'-4,4'-benzophenone tetracarboxylic dianhydride, Mischler's ketone, and mixtures thereof.

The first treatment solution is intended to functionalize the lens surface, i.e., to prepare the surface for facile grafting or bonding of macromeric species thereto. The solution may include about 0.1 to 10 millimoles/liter (mmol/L) benzophenone, about 10 to 50 weight percent solvent, and about 90 to 50 weight percent water, in which the water and solvent weight percentages are based on the water/solvent mixture. More preferably, the first solution includes about 0.5 to 5 weight percent benzophenone, about 20 to 40 weight percent solvent, and about 60 to 40 weight percent water. Suitable solvents for benzophenone include, without limitation thereto, short chain alcohols such as isopropanol, ethanol, and the like. Preferably, the solvent is miscible with water, so that a homogeneous system is produced.

While the invention is not limited to theoretical explanations of operability, the following theory is offered to better enable the reader to understand the invention. It is believed that the benzophenone separates out of the solution at unduly low solvent levels. Thus, low solvent levels may create a heterogeneous system, and promote non-uniform surface functionalization. However, increasing solvent concentration may cause the lens to swell. The swelling is believed to increase the lens porosity. At excessively high solvent concentrations, the pores in the lens material are large enough to allow penetration of the macromer into the lens structure, thereby causing lens deformation and optical distortions. Thus, a proper surface treatment is achieved by maintaining the solvent concentration high enough to provide a homogenous mixture (and uniform treatment), while maintaining the solvent concentration below the point at which unacceptable macromer penetration (and optical distortion) occurs.

The first solution may be exposed to the lens for a period of about 1 to 30 minutes, more preferably about 5 to 20 minutes, and most preferably about 8 to 12 minutes. Subsequent to contact with the first solution, the lens is removed from the first solution and evaporated under conditions which do not substantially damage the lens.

Evaporation of the solvent is preferred. Evaporation may be accomplished in a number of ways, including air drying and application of a limited amount of heat or air currents. The lens may be air dried for about 30 minutes to 3 hours, more preferably about 1 to 2 hours, depending on the temperature and relative humidity. Subsequent to air drying, the lenses may be placed in a nitrogen atmosphere. Then, a vacuum may be generated, preferably at a pressure of less than about 0.5 millibars. More preferably, the lenses are nitrogen and vacuum treated during two or more cycles.

The amount of water and/or solvent remaining in the lens depends on the specific treatment composition selected and the core polymer material chosen for treatment. It is preferable to remove the bulk of the solvent so that the photosensitizer remains on the surface of the article to be treated. Preferably, the solvent and water are substantially completely evaporated, i.e., less than 50 weight percent solvent/water remains in the lens. More preferably, less than about 25 weight percent solvent/water remains in the lens.

Preferably subsequent to the evaporation step, the lens is contacted with a second solution including macromer. The second solution preferably includes about 1 to 50 weight percent macromer and about 99 to 50 weight percent water. More preferably, the second solution includes about 5 to 10 weight percent macromer and about 95 to 90 weight percent water.

After contacting the lens with the macromer-containing solution, grafting of the macromer to the lens surface is initiated by applying ultraviolet light in an amount and for a time sufficient to cause a substantial amount of the macromer to bond to the lens surface. The UV light may be applied at an intensity of about 25 to about 100 milliwatts per square centimeter ($mW/cm^2$) for a period of about one minute to one hour. More preferably, the UV light is applied at an intensity of about 50 to about 60 $mW/cm^2$ for a period of about 5 to 20 minutes.

Subsequent to photoinitiation of the macromer-bonding reaction, the lens may be subjected to an optional step of extraction to remove any undesirable remaining solvent. For example, the lens may be rinsed with a solution of deionized water, followed by a solution of about 10 to 30 weight percent isopropanol with about 90 to 70 weight percent water.

A wide variety of hydrophilic macromers are useful in the present invention, including without limitation thereto, polalkylene oxides such as polyethylene oxide; polydimethylacrylamides; polyvinyl alcohols; poly(acrylates); poly(methacrylates) such as poly(2-hydroxyethyl methacrylate); poly(N-vinylpyrrolidone); poly(acrylamides) such as poly(N,N-dimethylacrylamide); derivatives, copolymers, mixtures thereof, and the like. A more preferred group of hydrophilic macromers includes polyethylene oxides, polyvinyl alcohols, and polyacrylamides, especially poly(N,N-dimethylacrylamide). Furthermore, it may be possible to apply a mixture of functionalized macromers with polymers.

However, the macromers useful in accordance with the present invention must have a size sufficient to prevent the macromer from substantially penetrating the polymer network of the lens. If the polymer network is penetrated, the lens may swell and become distorted. Minor amounts of swelling can cause intolerable amounts of deviation in the intended overall or localized optical power of the lens, thereby distorting the vision of the ultimate consumer. Also, a poor fit to the consumer's eye can occur if the lens swells. Moreover, the unpredictability of the swelling can further complicate matters. Accordingly, the macromers useful in the present invention have a size sufficiently large such that no substantial amount of macromer penetrates the article to be treated (e.g., a contact lens) causing substantial distortion of the article.

With respect to optical lenses, the macromers preferably have a size sufficiently large to produce a contact lens having a final diameter which differs less than 10% with respect to the diameter of the untreated lens. More preferably, the lens diameter changes less than about 5%, even more preferably, less than about 2%.

One method of measuring the relative size of a macromer is molecular weight. The preferred molecular weight of the macromers is a number-average molecular weight greater than about 500. A more preferred number-average molecular weight is above about 1000.

The previous disclosure will enable one having ordinary skill in the art to practice the invention. In order to better enable the reader to understand specific embodiments and the advantages thereof, reference to the following examples is suggested.

EXAMPLE I

Hydrogel contact lenses are soaked in a first solution including about 3 mmol/L benzophenone in a 70/30 weight ratio water/isopropyl alcohol mixture. The lenses are air dried at room temperature for about 90 minutes. The lenses are placed in a nitrogen atmosphere in a chamber which is evacuated under 2 cycles vacuum in order to degas the lenses.

After degassing, the lenses are placed into molds containing a solution of polyvinylalcohol (PVA) macromer at a concentration of about 5 weight percent in water. The macromer has a number-average molecular weight of about 16,000 grams/mol.

The molds, which contain the lenses and macromer solution, are subjected to ultraviolet light at an intensity of about 5.8 to 6.0 mW/cm$^2$ for about 10 minutes, in order to bond the macromer to the lens surface.

After treatment, the lenses are removed from the molds and rinsed with deionized water, followed by a rinsing with a 20/80 volume ratio isopropanol/water solution. The lenses are autoclaved at a temperature of about 121 C for a period of about 30 minutes before measurements are taken.

COMPARATIVE EXAMPLE II

The treatment procedures described in Example I are followed substantially in this Example, with the exception being that the macromer is a polyoxyethylene having number-average molecular weight of about 1000.

The invention has been described in detail, with reference to certain preferred embodiments, in order to enable the reader to practice the invention without undue experimentation. However, a person having ordinary skill in the art will readily recognize that many of the previous components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims.

That which is claimed is:

1. A method of treating the surface of an ophthalmic lens susceptible to unacceptable monomer or macromer penetration, comprising the steps of:
   (a) immersing said ophthalmic lens in a first homogeneous solution obtained by dissolving a water-insoluble photosensitizer in a mixture of water and at least one water-miscible solvent;
   (b) removing said ophthalmic lens from said first homogeneous solution;
   (c) evaporating at least a portion of said solvent from said ophthalmic lens;
   (d) placing said ophthalmic lens in a second solution containing at least one hydrophilic macromer having a number-average molecular weight of at least 500; and
   (e) applying radiation to said ophthalmic lens for a period sufficient to cause at least a portion of said macromer to bond to the surface of said ophthalmic lens,
   wherein the concentration of said at least one water-miscible solvent is present in said mixture in an amount sufficiently high enough to dissolve said photosensitizer to provide the homogeneous solution, but sufficiently low enough to induce at most an insignificant swelling in and/or on said ophthalmic lens, wherein the insignificant solvent-induced swelling is characterized by that no substantial amount of said macromer penetrates the swelled ophthalmic lens to cause intolerable amounts of deviation in shape or optical properties of said ophthalmic lens.

2. A method of claim 1, wherein said photosensitizer is selected from the group consisting of benzophenone, thioxanethen-9-one, 2-acetonaphthone, and mixtures thereof.

3. A method of claim 2, wherein said photosensitizer is a benzophenone.

4. A method of claim 3, wherein said benzophenone is selected from the group consisting of benzophenone; 4-fluorobenzophenone; 4-chlorobenzophenone; 4-benzoylbenzoic acid; 3,3'-4,4'-benzophenone tetracarboxylic dianhydride, Mischler's ketone, and mixtures thereof.

5. A method of claim 1, wherein said macromer has a number-average molecular weight of at least 1000.

6. A method of claim 1, wherein said article is a hydrogel, having at least about 10 weight percent water when fully hydrated.

7. A method of claim 1, wherein said macromer is selected from the group consisting of polyalkylene oxides, polydim ethyl acrylamides, mixtures thereof, and copolymers thereof.

8. A method of claim 7, wherein said macromer is a polyethylene oxide.

9. A method as recited in claim 7, wherein said macromer is a polyalkylene oxide having a number-average molecular weight greater than about 1000.

10. A method of claim 1, wherein said ophthalmic lens is formed from a silicon-containing polymer.

11. A method of claim 10, wherein said silicon-containing polymer is a polydimethylsiloxane.

12. A method of claim 1, wherein said ophthalmic lens is a contact lens.

13. A method of claim 1, wherein said mixture comprises about 60 to 80 percent by weight of water and about 20 to 40 percent by weight of the solvent.

14. A method of claim 1, wherein said second solution includes about 1 to 50 percent by weight of said macromer and about 99 to 50 percent by weight of water.

15. A method of claim 13, wherein said second solution includes about 1 to 50 percent by weight of said macromer and about 99 to 50 percent by weight of water.

16. A method of claim 14, wherein said mixture of the water and the solvent comprises about 60 to 80 percent by weight of water.

* * * * *